May 7, 1935. W. PUTNAM 2,000,297

FLUSH VALVE

Filed Oct. 25, 1932 2 Sheets-Sheet 1

INVENTOR:
WALTER PUTNAM,
By
ATTORNEY.

May 7, 1935. W. PUTNAM 2,000,297
FLUSH VALVE
Filed Oct. 25, 1932 2 Sheets-Sheet 2
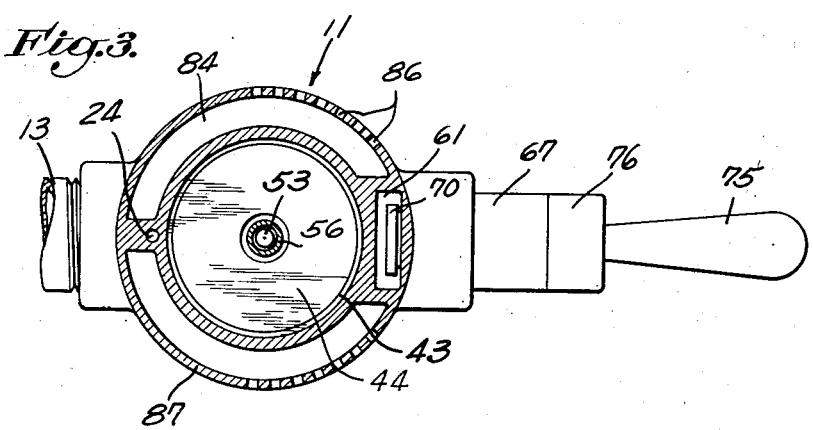
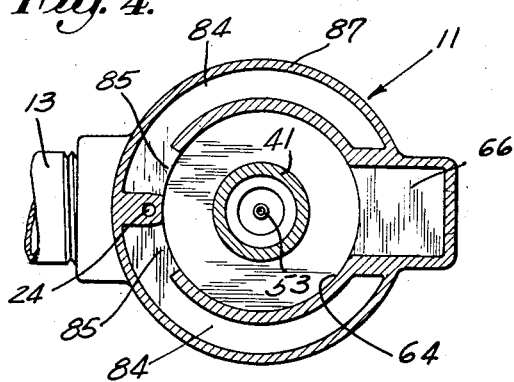
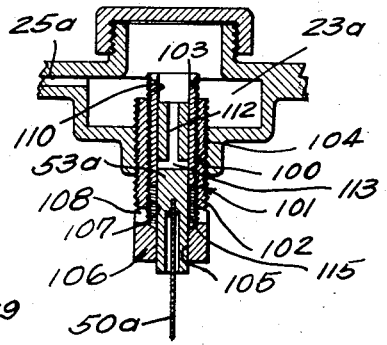
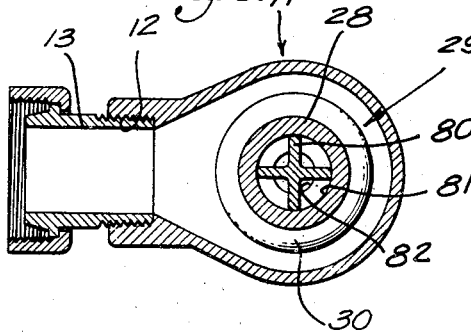
INVENTOR:
WALTER PUTNAM,
By
ATTORNEY.

Patented May 7, 1935

2,000,297

UNITED STATES PATENT OFFICE 2,000,297

FLUSH VALVE

Walter Putnam, Pasadena, Calif.

Application October 25, 1932, Serial No. 639,429

13 Claims. (Cl. 137—93)

My invention relates to automatically closing valves and relates particularly to valves of the character commonly known as flush valves and employed to deliver a flow of flushing water to receptacles such as toilet bowls.

An object of the invention is to provide a valve of this character having automatic closing means, which valve will produce an initial flushing flow of water of sufficient volume and velocity to thoroughly flush the receptacle and will subsequently deliver a small flow of water to refill the receptacle after completion of the flushing operation.

It is an object of the invention to provide a valve of the above character in which the closing of the valve member is accomplished and controlled by an actuating flow of fluid, and in which a simple valve mechanism is provided for controlling the flow of actuating fluid in such a manner that a performance of the valve as set forth in the preceding paragraph will be accomplished.

It is a further object of the invention to provide a self-closing flush valve which is of the non-siphoning type and cannot be opened by creation of a vacuum in the water supply pipes and therefore avoids siphoning from the bowl or receptacle into the water supply system when a partial vacuum is produced in the water supply system.

Further objects and advantages of the invention will be made evident throughout the following part of the specification.

Referring to the drawings, which are for illustrative purposes only,

Fig. 3 is a cross section on the line 3—3 of Fig. 1.
Fig. 4 is a cross section on the line 4—4 of Fig. 1.

Fig. 5 is a cross section on the line 5—5 of Fig. 1.

Fig. 6 is a fragmentary, vertically sectioned view showing a form of control valve adapted for adjustment to vary the length of the initial closing movement and the length of the final closing movement of the valve structure.

Figure 1:
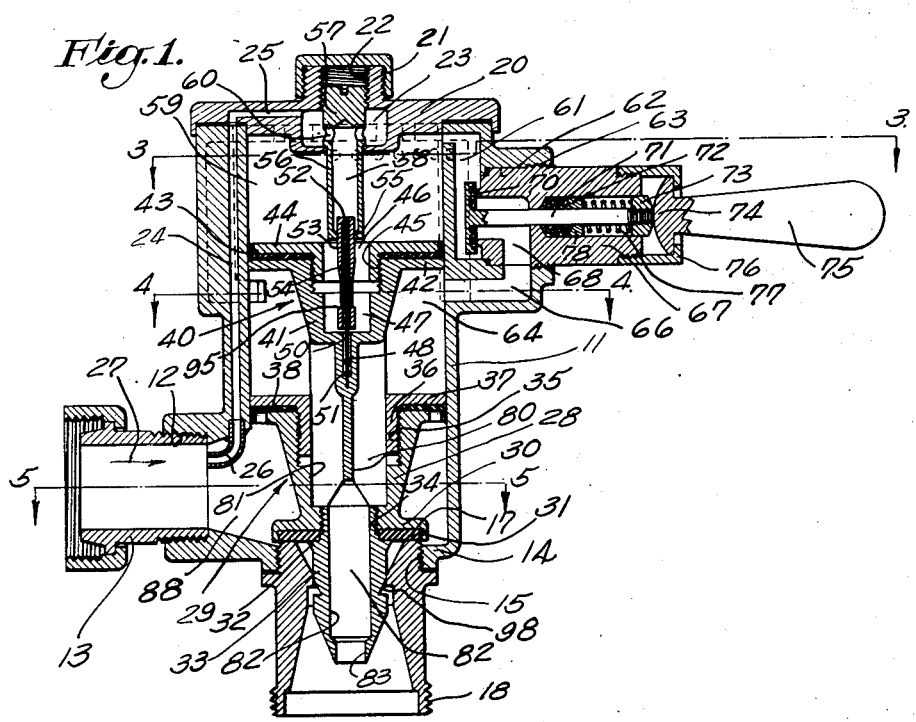
Fig. 1 is a vertically sectioned view of a preferred form of my invention, with the valve element thereof in closed position.
Figure 2:
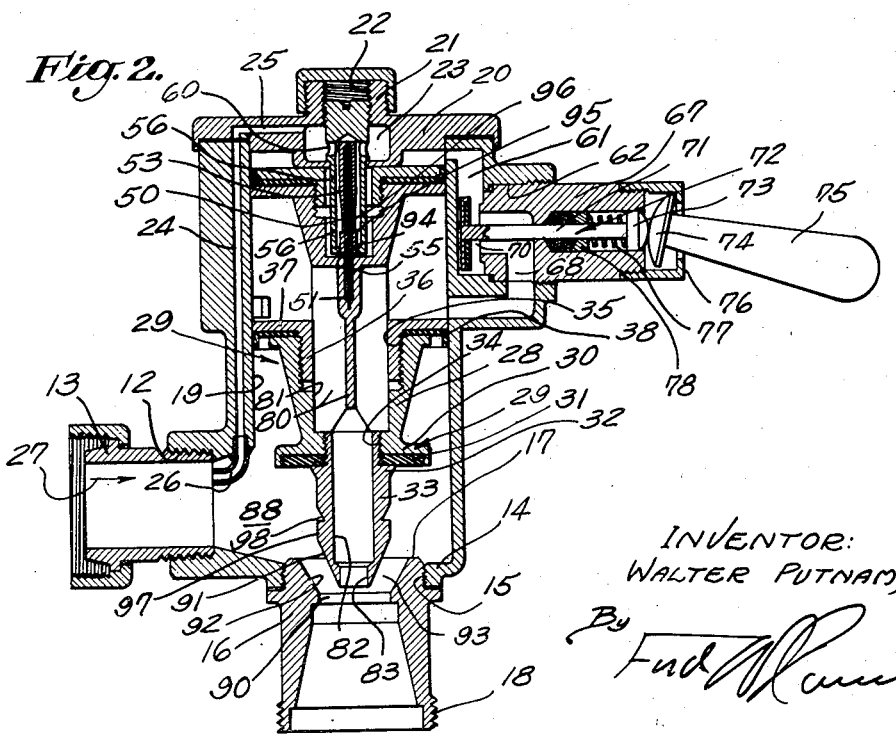
Fig. 2 is a view similar to Fig. 1, showing the parts in open position.

As shown in Figs. 1 and 2, the valve includes a cylindrical body 11 having a laterally extending threaded inlet 12 near the lower end thereof to which a water supply pipe may be connected by means of fittings 13. The lower end of the body 11 is equipped with an end wall 14 having a threaded opening 15 adapted to receive an orifice fitting 16 having an annular valve seat 17 at its upper end and having threads 18 at its lower end whereby the valve body may be attached to the inlet conduit, not shown, of a receptacle such as a toilet bowl. The body 11 has a cylindrical bore 19 which is open at its upper end and is adapted to be closed by a cap or head 20 having an externally threaded concentric projection 21 and a threaded bore 22 in the projection 21 which communicates with a chamber 23. The fluid from the inlet 12 is adapted to be fed into the chamber 23 through a vertical passage 24 in the wall of the body 11 and a radial passage 25 formed in the cap 20. To increase the pressure of fluid in the chamber 23 at certain times during the operation of the valve, an injector nozzle may be provided at the lower end of the passage 24, this injector nozzle consisting of a small tube 26 having the lower or outer end thereof bent so as to face the flow of water which passes in through the inlet 12, as indicated by the arrow 27, when the valve is operating to discharge water through the fitting 16 into the inlet conduit of a receptacle. In the lower part of the bore 19 a valve structure 29 is placed which includes a valve body 28 having a radial flange 30 at its lower end for supporting a main valve element 31 which may be in the form of an annular gasket adapted to be held in place by a shoulder 32 on a secondary valve element 33 which screws into threads 34 formed in the lower part of the valve body 28. The upper end of the member 28 has a threaded counterbore 35 into which is screwed a cylindrical projection 36 formed on a flange or circular plate 37 which is positioned transversely within the bore 19 and provides a piston for the valve structure 29. To provide a seal a cup washer 38 is placed on the under face of the member 37 and has the inner portion thereof gripped between such member 37 and the upper end of the body 28.

In the upper part of the bore 19 is an actuating member 40 consisting of a body 41 having a flange 42 at its upper end forming a piston within the bore 19. A cup washer 43 is secured to the upper face of the flange 42 by means of a circular plate 44 which screws into a threaded counterbore 45 and has an opening 46 communicating with a recess 47 in the body 41 which has a smaller concentric opening or recess 48 extending downwardly from the bottom of the recess 47 and being adapted to receive a flexible stem 50 in the form of a length of steel wire, the lower end of which is secured in the lower end of the recess 48 as indicated at 51 by such suitable means as soldering, and the upper end of which is secured at 52 to the upper end of a movable control valve element 53 having a bore 54 extending upwardly from its lower end and being of larger diameter than the stem 50. The movable valve part 53 extends into an opening 55 in the lower end of a tubular stationary control valve part 56 which projects from the lower end of a threaded body 57. The tubular part 56 has an opening 58 therein above the opening 55 which is of larger diameter than the movable control valve part 53 and which communicates with the chamber 23 through radial openings 60.

As shown in Figs. 1 to 4, a passage 61 is formed in the front wall of the body 11 which communicates with the upper end of a space 59 formed above the actuating member 40 in the bore 19 and also communicates with a laterally extending opening 62 having threads 63 at its forward end. From a space or chamber 64 formed within the bore 19 between the actuating member 40 and the valve member 29 a passage 66 extends into communication with the lower side of the opening 62. Threaded into the opening 62 is a valve body 67 having a passage 68 which is adapted to connect the passages 61 and 66 and is normally closed by a valve 70 mounted on the inner end of a stem 71 which passes through a stuffing box 72 and has upon the end thereof a nut or head 73 adapted to be engaged by the inner end 74 of a handle 75 which is held in place on the outer end of the valve body 67 by a cap 76. A spring 77 placed under the nut 73 exerts a force against a slidable gland member 78 to compress the packing of the packing means 72 and to hold the valve 70 normally in closed position. The lower portion of the actuating member 40, as shown in Figs. 1, 2, and 5, is provided with guide means in the form of radial webs 80 which extend into a concentric opening or bore 81 formed within the members 28 and 36. This bore 81 connects with an opening or bore 82 extending through the secondary valve element 33 of the member 29 and having a diametrally reduced portion 83 at its lower end.

As shown in Figs. 1, 3, and 4, the body 11 has arcuate air spaces or passages 84 formed therein, which passages 84 connect through openings 85 with the chamber 64 formed between the members 29 and 40 and communicate with the open atmosphere through small radial openings 86 in the upper part of the thin wall structure 87 enclosing the arcuate passages 84.

The operation of the valve device is as follows: Assuming that the inlet 12 is connected through a water piping system and the valve is in closed position as shown in Fig. 1, the chamber 59 above the actuating member 40 will be filled with water which has entered through the passages 24 and 25 and the opening 58 of the tubular member 56, the pressure of which water forces the members 40 and 28 downwardly and holds the valve element or gasket 31 in engagement with the valve face or seat 17. The swinging of the handle 75 into an angular position will force the head 73 inwardly with the result of moving the valve 70 into open position. Through the passages 61, 68, and 66 the chamber 59 is thus placed in open communication with the chamber 64 which in turn communicates through the bores 81 and 82 and the fitting 16 with the interior of the receptacle to be flushed, and therefore water may be discharged from the chamber 59 as the result of opening the valve 70, permitting the water pressure in the space 88 to force the valve body 28 and the actuating member 40 upwardly in the bore 19 to the fully raised position in which these parts are shown in Fig. 2, after which the handle 75 is released, permitting the spring 77 to reclose the valve 70. The member 33 is thereby raised from the diametrally reduced opening 90 of the member 16, and between the conical face 91 formed on the lower end of the member 33 and the conical face 92 in the upper end of the member 16 a passage 93 now exists through which a large flow of water may be discharged from the space 88 through the fitting 16 into the conduit, not shown, connected to the receptacle to be flushed. When the part 40 is in fully raised position as shown in Fig. 2, the lower end 94 of the movable valve part 53 is in the opening 55 of the tubular member 56, and the flow of water into the chamber 59 through the passages 24 and 25 and the tubular member 56 is restricted to a small amount for the reason that the lower end 94 of the member 53 nearly fills the opening 55. Accordingly, the actuating member 40 will be forced downwardly at a slow rate of speed, permitting the passage 93 to remain open for a sufficient length of time to permit an ample flushing flow of water into the receptacle to be flushed. When the valve part 53 has been moved downwardly a sufficient distance to bring the shoulder 95 of the diametrally reduced portion 96 below the lower extremity of the opening 55, a relatively large flow of fluid from the tubular member 56 into the chamber 59 will occur, and the parts 40 and 29 will move downwardly relatively rapidly, thereby bringing the outer cylindrical face 97 of the member 33 into the diametrally reduced opening 90 so that the flow of water from the chamber 88 will be reduced to a very small amount. By making a close fit of the cylindrical face 97 in the opening 90, the flow of water through the opening 90 may be substantially cut off, and to permit a small flow of water to refill the receptacle after completion of the flushing operation, a clearance 98 in the form of a groove may be cut in the cylindrical face 97, as shown. As this groove 98 passes the opening 90, a refilling flow of fluid into the receptacle is accomplished, this flow being supplemented by whatever leakage may occur between the wall of the opening 90 and the cylindrical face 97 of the member 33. It will be noted that the upper end of the valve part 53 is enlarged above the diametrally reduced portion 96 so that the flow of actuating water into the chamber 59 through the opening 55 will be very greatly reduced, and consequently the final downward movement of the members 40 and 28 will be relatively slow.

Should a vacuum be produced in the water supply piping connected to the inlet 12, air entering through the ports 86, chambers 84, and ports 85 at atmospheric pressure will exert a downward pressure on the piston of the member 28, formed by the annular plate or flange 37, sufficient to hold the valve tightly in closed position so that siphoning cannot occur through the member 16 from the receptacle with which it is connected. Should the member 40 be in raised or partly raised position at the time the condition of partial vacuum is exerted in the space 88, the valve structure 29 may be moved downwardly into closed position by such vacuum condition independently of the member 40 for the reason that the extension 80 of the member 40 is slidable in the bore 81 of the member 29, and therefore the member 29 may move downwardly independently, and in so doing the bore 81 will slide downwardly relative to the extension 80 of the member 40.

The tubular member 56 may be raised and lowered to change the length of the flushing flow of water through the passage 93. It will be seen that if the tubular member 56 is raised from the position in which it is shown in Fig. 2, the part 53 in its downward movement will have a shorter distance to travel before the shoulder 95 is drawn from the lower extremity of the opening 55, thereby shortening the time of the flushing flow of fluid.

In Fig. 6 I show a form of closing control valve making it possible to separately control the flush and refill operations of the valve structure. In this view I show a chamber 23a corresponding in position and function to the chamber 23 of Figs. 1 and 2, which is fed with fluid through a passage 25a. Leading downwardly from the chamber 23a is a threaded opening 100 adapted to receive a stationary valve part 101 consisting of an outer sleeve 102 and an inner sleeve 103. The outer sleeve has external threads 104 so that it may be screwed up and down in the threaded opening 100 and has an opening 105 formed in a cylindrical wall 106 at its lower end, and has a counterbore 107 above the opening 105 which is threaded to receive the sleeve 103. Lateral openings 108 connect the counterbore with the lower end of the chamber 59. The sleeve 103 has a bore 110 of substantially the same diameter as the bore or opening 105 of the wall 106, and within these openings 105 and 110 a movable part 53a extends which may be connected to the actuating member 40 by means of a flexible stem 50a. The movable valve part 53a has an axial opening 112 extending downwardly from its upper end to connect with a diametral passage 113. In Fig. 6 the movable valve part 53a is shown in raised position corresponding to the raised position of the actuating member 40 shown in Fig. 2. At this time the passage 113 is within the lower part of the sleeve 103; consequently, the flow of water through the sleeve and into the space 115 below the sleeve 103 is relatively small so that the amount of water entering the chamber 59 moves the actuating member 40 downwardly at a slow rate of speed, at which time a relatively large or flushing flow of water is discharged through the opening 90 of the valve. When the passage 113 is moved to a position below the lower end of the sleeve 103, a relatively large flow of water may pass into the space 115 and through the lateral openings 108 into the chamber 59 so that a rapid movement of the actuating member 40 is obtained, to move the secondary valve element 33 into the opening 90. When the passage 113 enters the opening 105 at the lower end of the sleeve 103, the flow of water into the chamber 59 is again reduced so that the speed of movement of the actuating means 40 in downward direction is reduced so as to delay the final closing of the valve and permit a desired refilling flow through the small space existing between the secondary valve element 33 and the wall of the opening 90. By changing the position of the tubular members 102 and 103 a desired flushing and refilling movement of the valve structure 29 may be obtained, for the vertical dimension of the space 115 and the positions of the walls forming the openings 105 and 110 may be readily varied to give the desired operation of the valve.

A further feature of a valve device of this character is that it is self-cleaning due to the fact that the parts thereof are movable and that at one position of operation of the movable valve part 33 a relatively large flow of water occurs through the openings, this being a marked improvement over flush valves in which a minute flow of water through a set needle valve is employed to control the operation of the valve.

The fluid passing through the annular opening between the walls 91 and 92 travels at a much higher velocity than in the larger passages above and below this point. Due to the Bernoulli effect, there is a reduction in pressure at the lower end of the bore 82, caused by this higher velocity. By properly proportioning these openings, the pressure at this point may be reduced below atmospheric pressure, and therefore no fluid flows upwardly through the bore 82 but air at atmospheric pressure is drawn into the discharge. This makes it possible to maintain an open connection between the discharge member and the atmosphere without danger of discharging water through said open connection during flushing and refilling of the toilet bowl.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein, but is to be accorded the full scope of the following claims.

I claim as my invention:

1. In a flush valve mechanism for controlling the flow of water from a supply pipe to a conduit leading to a toilet bowl, the combination of: a body having a bore with a discharge opening at the lower end thereof and a valve seat at the inner end of said discharge opening, and inlet means adapted to connect the lower end of said bore with said supply pipe; valve means in the lower part of said bore having a main valve element adapted to engage said valve seat and a projecting secondary valve element adapted to project into said opening, there being an annular wall at the upper end of said valve means forming a piston in said bore above said inlet means, said valve means having an axial opening from the top to the bottom thereof; an actuating piston in the upper part of said bore having a projection extending downwardly into engagement with said valve means, there being an air chamber formed between said actuating piston and the upper end of said valve means and a fluid chamber above said actuating piston in said bore; walls forming a passage connecting the fluid chamber with said inlet means for introducing a flow of water into said fluid chamber; walls forming a releasing passage connecting said fluid chamber with said air chamber; and valve means in said releasing passage adapted to be opened to permit the discharge of water from said fluid chamber into said air chamber, said water flowing from said air chamber through said axial opening of said valve means.

2. In a flush valve mechanism for controlling the flow of water from a supply pipe to a conduit leading to a toilet bowl, the combination of: a body having a bore with a discharge opening at the lower end thereof and a valve seat at the inner end of said discharge opening, and inlet means adapted to connect the lower end of said bore with said supply pipe; valve means in the lower part of said bore having a main valve element adapted to engage said valve seat and a projecting secondary valve element adapted to project into said opening, there being an annular wall at the upper end of said valve means forming a piston in said bore above said inlet means, said valve means having an axial opening from the top to the bottom thereof; an actuating piston in the upper part of said bore having a projection extending downwardly into engagement with said valve means, there being an air chamber formed between said actuating piston and the upper end of said valve means and a fluid chamber above said actuating piston in said bore, there being passage means in said body connecting said air chamber with the open atmosphere; walls forming a passage connecting the fluid chamber with said inlet means for introducing a flow of water into said fluid chamber; walls forming a releasing passage connecting said fluid chamber with said air chamber; and valve means in said releasing passage adapted to be opened to permit the discharge of water from said fluid chamber into said air chamber, said water flowing from said air chamber through said axial opening of said valve means.

3. In a flush valve mechanism for controlling the flow of water from a supply pipe to a conduit leading to a toilet bowl, the combination of: a valve body; a main valve member adapted when fully seated to shut off the flow of water from said pipe to said conduit; means on said valve member for regulating the flow of said water during the time said toilet is being flushed; means on said valve member for passing sufficient water to said conduit to refill said bowl; means for regulating the closing speed of said valve member so as to enable it to flush and refill said bowl; open and unobstructed means for admitting air under atmospheric pressure through said valve member to said conduit; means for reducing the water pressure so that water will not flow out through said open and unobstructed means for admitting air during the flushing and refilling of said bowl; and means for changing the length of the flushing flow.

4. In a flush valve mechanism for controlling the flow of water from a supply pipe to a conduit leading to a toilet bowl, the combination of: a body having a bore providing a discharge opening at its lower end and a valve seat at the inner end thereof; walls forming inlet means adapted to connect the lower end of said bore with said supply pipe; valve means in the lower part of said bore providing a main valve element adapted to engage said valve seat and a secondary valve element adapted to project into said opening; an annular wall disposed at the upper end of said valve means forming a piston in said bore above said inlet means; walls forming an axial opening in said valve means leading from the top to the bottom thereof; an actuating piston in the upper part of said bore having a projection extending downwardly into engagement with said valve means, there being an air chamber formed between said actuating piston and the upper end of said valve means and a fluid chamber above said actuating piston in said bore; walls forming a passage connecting said fluid chamber with said inlet means for introducing a flow of water into said fluid chamber; walls forming a releasing passage connecting said fluid chamber with said air chamber; and valve means in said releasing passage adapted to be opened to permit the discharge of water from said fluid chamber into said air chamber.

5. The combination as set forth in claim 4, and means for changing the length of the flushing flow.

6. In a flush valve mechanism for controlling the flow of water from a supply pipe to a conduit leading to a toilet bowl, the combination of: a body providing a bore having a discharge opening at the lower end and a valve seat at the inner end thereof; walls forming an inlet in said body adapted to connect the lower end of said bore with said supply pipe; valve means in the lower part of said bore including a main valve element adapted to engage said valve seat and a secondary valve element adapted to project into said opening; an annular wall on the upper end of said valve means forming a piston in said bore above said inlet, said valve means having an axial opening extending from the top to the bottom thereof; an actuating piston in the upper part of said bore having a projection extending downwardly into engagement with said valve means; walls forming an air chamber between said actuating piston and the upper end of said valve means and providing a fluid chamber above said actuating piston in said bore; walls forming a passage in said body connecting said air chamber with the open atmosphere; walls forming a passage connecting said fluid chamber with said inlet means for introducing a flow of water into said fluid chamber; walls forming a releasing passage connecting said fluid chamber with said air chamber; and valve means in said releasing passage adapted to be opened to permit the discharge of water from said fluid chamber into said air chamber.

7. In a flush valve mechanism for controlling the flow of water from a supply pipe to a conduit leading to a toilet bowl, the combination of: a body providing a bore having a discharge opening at the lower end and a valve seat at the inner end thereof; walls forming an inlet in said body adapted to connect the inner end of said bore with said supply pipe; valve means including a main valve element adapted to engage said valve seat and a secondary valve element, said valve means passing a flushing flow when in open position with the secondary valve element above said discharge opening and passing a refilling flow when in open position with said secondary valve element projecting into said discharge opening; an annular wall on the upper end of said valve means forming a piston in said bore above said inlet, said valve means having an axial opening extending from the top to the bottom thereof; an actuating piston in the upper part of said bore having a projection extending downwardly into engagement with said valve means; walls forming an air chamber between said actuating piston and the upper end of said valve means and providing a fluid chamber above said actuating piston in said bore; walls forming a passage in said body connecting said air chamber with the open atmosphere; walls forming a passage connecting said fluid chamber with said inlet means for introducing a flow of water into said fluid chamber; walls forming a releasing passage connecting said fluid chamber with said air chamber; and valve means in said releasing passage adapted to be opened to permit the discharge of water from said fluid chamber into said air chamber.

8. The combination as set forth in claim 6, in which the valve means in said releasing passage when opened causes the water to flow from said fluid chamber through the air chamber and through the axial opening of said valve means.

9. In a valve mechanism for controlling the flow of water from a supply pipe to a discharge conduit, the combination of: a valve body having an opening therein communicating with the atmosphere; a valve seat in said valve body; and a valve member movable from contact with said seat, in which position it shuts off the flow of water from said pipe to said conduit, to a position out of contact with said seat, in which position it passes water from said pipe to said conduit, said valve member having an opening therein connecting said opening in said body to said conduit at all positions of said valve member to prevent passage of water from said conduit to said pipe in response to a decrease of pressure in said pipe.

10. In a flush valve mechanism for controlling the flow of water from a supply pipe to a conduit leading to a toilet bowl, the combination of: a body providing a bore having a discharge opening at the lower end and a valve seat at the inner end thereof; walls forming an inlet in said body adapted to connect the lower end of said bore with said supply pipe; valve means in the lower part of said bore including a main valve element adapted to engage said valve seat and a secondary valve element adapted to project into said opening; an annular wall on the upper end of said valve means forming a piston in said bore above said inlet, said valve means having an opening extending from the top to the bottom thereof; an actuating piston in the upper part of said bore having a projection extending downwardly into engagement with said valve means; walls forming an air chamber between said actuating piston and the upper end of said valve means and providing a fluid chamber above said actuating piston in said bore; walls forming a passage in said body connecting said air chamber with the open atmosphere; walls forming a passage connecting said fluid chamber with said inlet for introducing a flow of water into said fluid chamber; walls forming a releasing passage connecting between said fluid chamber and said air chamber; valve means in said releasing passage adapted to be opened to permit the discharge of water from said fluid chamber into said air chamber; and means for changing the length of the flushing flow.

11. In a flush valve mechanism for controlling the flow of water from a supply pipe to a conduit leading to a toilet bowl, the combination of: a body; walls forming a bore in said body having a discharge opening at its lower end and a valve seat at the inner end thereof; walls forming an inlet connecting between the lower end of said bore and said supply pipe; valve means in the lower part of said bore including a main valve element adapted to engage said valve seat and a secondary valve element adapted to project into said discharge opening; an annular wall on the upper end of said valve means forming a piston in said bore above said inlet; walls forming an axial opening in said valve means leading from the top to the bottom thereof; an actuating piston in the upper part of said bore having a projection extending into engagement with said valve means, there being an air chamber formed between said actuating piston and the upper end of said valve means and a fluid chamber above said actuating piston in said bore; walls forming a passage connecting between said fluid chamber and said inlet for introducing a flow of water into said fluid chamber; walls forming a releasing passage connecting said fluid chamber with said air chamber; valve means in said releasing passage adapted to be opened to permit the discharge of water from said fluid chamber into said air chamber; and means for changing the length of the flushing flow.

12. In a flush valve mechanism for controlling the flow of water from a supply pipe to a conduit leading to a toilet bowl, the combination of: a body having an inlet opening adapted to be connected to said supply pipe and having a discharge opening adapted to be connected to said conduit, there being a valve seat at the inner end of said discharge opening; valve means movable in said body from closed to open position, said valve means having a main valve element engageable with said valve seat, and a secondary valve element adapted to project into said discharge opening so as to reduce the flow therethrough to a small amount, said valve means being so constructed that the pressure of water entering said body from said supply pipe tends to move said valve means to open position; actuating means for moving said valve means toward closed position, said actuating means comprising a fluid chamber and a member in said chamber connected to said valve means; walls forming an inlet passage extending from said chamber to a point to receive water from said supply pipe; and a control valve comprising a stationary valve part having a discharge orifice, and a movable valve part adapted to move relative to said discharge orifice and being connected to said movable member so as to be moved thereby, said valve parts being so relatively constructed that a relatively small flow of fluid is permitted through said discharge orifice when said movable valve part is near the extremes of its movement and a relatively larger flow when said movable valve part is in intermediate position.

13. A device as defined in claim 12 including means for changing the length of the larger flow.

WALTER PUTNAM.